(12) United States Patent
Bright et al.

(10) Patent No.: US 10,773,392 B2
(45) Date of Patent: Sep. 15, 2020

(54) FLEXURE GRIPPING DEVICE

(71) Applicant: Multiply Labs Inc., San Francisco, CA (US)

(72) Inventors: Lawrence Zachary Bright, San Francisco, CA (US); Jeffrey Ackerman Curhan, Warwick, RI (US); Kameron C. Chan, San Francisco, CA (US); Federico Parietti, San Francisco, CA (US)

(73) Assignee: Multiply Labs Inc., San Francisco, CA (US)

( * ) Notice: Subject to any disclaimer, the term of this patent is extended or adjusted under 35 U.S.C. 154(b) by 0 days.

(21) Appl. No.: 16/296,070

(22) Filed: Mar. 7, 2019

(65) Prior Publication Data

US 2019/0275683 A1 Sep. 12, 2019

Related U.S. Application Data

(60) Provisional application No. 62/639,816, filed on Mar. 7, 2018.

(51) Int. Cl.
| | |
|---|---|
| *B25J 15/00* | (2006.01) |
| *B26F 3/00* | (2006.01) |
| *B25J 9/00* | (2006.01) |
| *B25J 15/12* | (2006.01) |
| *B25J 19/00* | (2006.01) |
| *B25J 15/02* | (2006.01) |
| *B33Y 80/00* | (2015.01) |

(52) U.S. Cl.
CPC ......... *B25J 15/0028* (2013.01); *B25J 9/0015* (2013.01); *B25J 15/0253* (2013.01); *B25J 15/12* (2013.01); *B25J 19/007* (2013.01); *B26F 3/004* (2013.01); *B33Y 80/00* (2014.12)

(58) Field of Classification Search
CPC ...... B25J 9/0015; B25J 15/12; B25J 15/0253; B25J 15/0028; B25J 19/007; B33Y 80/00; B26F 3/004
See application file for complete search history.

(56) References Cited

U.S. PATENT DOCUMENTS

| | | | | | |
|---|---|---|---|---|---|
| 2,226,789 | A | * | 12/1940 | Tupy | B66C 1/425 |
| | | | | | 294/106 |
| 3,139,302 | A | * | 6/1964 | Orloff | B65G 47/90 |
| | | | | | 294/198 |

(Continued)

*Primary Examiner* — Stephen A Vu
(74) *Attorney, Agent, or Firm* — Morgan, Lewis & Bockius LLP

(57) ABSTRACT

A gripping device comprises multiple flexures configured to couple predetermined linkages, a fixed linkage, and an input linkage disposed partially above the fixed linkage. The input linkage comprises a first end portion and a second end portion. Each end portion comprises an output linkage comprising a first end portion and a second end portion, a jaw disposed on the first end portion of the output linkage, and an initial damper linkage disposed below the fixed linkage. The initial damper linkage is coupled with the fixed linkage, the corresponding end portion of the input linkage, and the second end portion of the output linkage. At least one auxiliary damper linkage is disposed below the fixed linkage and adjacent to the initial damper linkage. The at least one auxiliary damper linkage is coupled to the fixed linkage and the second end portion of the output linkage.

10 Claims, 9 Drawing Sheets

(56) References Cited

U.S. PATENT DOCUMENTS

| | | | | |
|---|---|---|---|---|
| 4,542,929 A | * | 9/1985 | Possinger | B66C 3/16 294/198 |
| 5,046,773 A | * | 9/1991 | Modesitt | B25J 7/00 294/100 |
| 5,819,386 A | * | 10/1998 | Koppe | B25B 27/023 29/261 |
| 2014/0367987 A1 | * | 12/2014 | Xiao | B25J 15/0052 294/192 |

* cited by examiner

FLEXURE GRIPPING DEVICE

BACKGROUND OF THE INVENTION

Field of the Invention

The present disclosure relates to a gripping device. More particularly, the present disclosure relates to a flexure gripping device.

Description of Related Art

Gripping devices are required in a variety of industries in order to accurately and precisely transport objects. For example, during fabrication of pharmaceutical capsules, a gripping device is required to transport an individual capsule for quality control. The capsule must be transported while minimizing a risk of contamination or product tampering.

Current pharmaceutical gripping devices include a number of moving parts. These moving parts generate fine particles during operation, which increases a chance for contaminating a surrounding region or an object being gripped. The presence of moving parts leads to gripping devices that are difficult to clean and sterilize, which is essential in industries that require intensive cleaning and quality assurance protocols such as pharmaceutical manufacturing. Furthermore, these conventional gripping devices are configured to handle a single object or material at a time, requiring frequent replacement and/or extensive cleaning and maintenance.

Thus, prior to the present disclosure there existed a need for flexure gripping devices.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Advantageously, the flexure gripping devices detailed in the present disclosure address the shortcomings in the prior art detailed above.

Various aspects of the present disclosure are directed to providing a flexure gripping device.

One aspect of the present disclosure provides a gripping device. The gripping device includes a fixed linkage and an input linkage that is disposed at least partially above the fixed linkage. The input linkage includes at least a first end portion and a second end portion. Each respective end portion of the input linkage includes an output linkage that includes a first end portion and a second end portion. Each respective end portion of the input linkage also includes a jaw disposed on the first end portion of the output linkage. Moreover, each respective end portion of the input linkage includes an initial damper linkage that is disposed below the fixed linkage. The initial damper linkage is coupled with the fixed linkage, the corresponding end portion of the input linkage, and the second end portion of the output linkage. Additionally, the gripping device includes a plurality of flexures. Each respective flexure in the plurality of flexures is configured to couple two or more linkages together.

In some embodiments, for each end portion of the input linkage the plurality of flexures includes a first flexure that couples the input linkage and the respective initial damper linkage, a second flexure that couples the respective initial damper linkage and the fixed linkage, and a third flexure that couples the respective initial damper linkage and the output linkage.

In some embodiments, at least one auxiliary damper linkage is disposed below the fixed linkage and adjacent to the initial damper linkage. Accordingly, the at least one auxiliary damper linkage coupled to the fixed linkage and the second end portion of the output linkage In some embodiments, for each respective auxiliary damper linkage the plurality of flexures includes a fourth flexure that couples the respective auxiliary damper linkage and the fixed linkage, and a fifth flexure that couples the respective auxiliary damper linkage and the output linkage.

In some embodiments, a distance travelled between an OPEN state and a CLOSED state of each jaw is 15 millimeters or less. In some embodiments, a distance travelled between an OPEN state and a CLOSED state of each jaw is 4 millimeters or less.

In some embodiments, the gripping device includes a deformable material.

In some embodiments, the gripping device is fabricated from a single piece of material.

In some embodiments, the gripping device is fabricated by additive manufacturing or water jet cutting.

In some embodiments, the gripping device further comprises a mount configured to attach the gripping device to transport mechanism.

In some embodiments, each jaw includes one of a tentacle, a cup, or a cone.

The flexure gripping devices of the present invention have other features and advantages that will be apparent from, or are set forth in more detail in, the accompanying drawings, which are incorporated herein, and the following Detailed Description, which together serve to explain certain principles of exemplary embodiments of the present invention.

Figure 1:
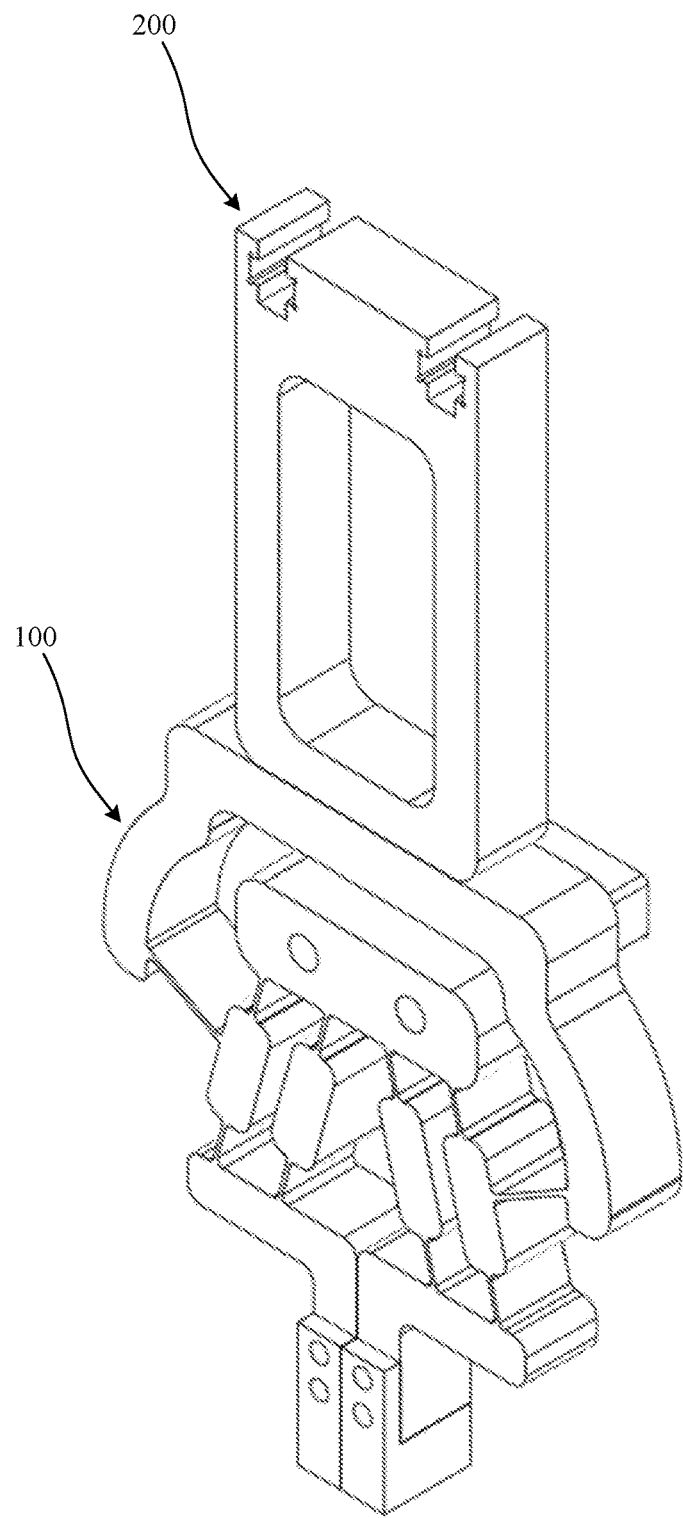
FIG. 1 is an isometric view of a gripping device in a closed state in accordance with an exemplary embodiment of the present disclosure.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It will also be understood that, although the terms first, second, etc. may be used herein to describe various elements, these elements should not be limited by these terms. These terms are only used to distinguish one element from another. For example, a first linkage could be termed a second linkage, and, similarly, a second linkage could be termed a first linkage, without departing from the scope of the present disclosure. The first linkage and the second linkage are both linkages, but they are not the same linkage.

By way of the term "deformable", as used herein, means an ability of a body to resist a distorting influence and to return to its original size and shape when the distorting influence is removed.

Various aspects of the present disclosure are directed to providing flexure gripping devices. The gripping devices have no moving and/or sliding parts and have a smooth and/or round general morphology in order to allow a simple cleaning and washing process of the gripping devices. Additionally, the gripping devices of the present disclosure require little to no maintenance, assembly, alignment, or a combination thereof as each device I substantially formed from a single piece of material.

Once aspect of the present disclosure is directed to providing a flexure gripping device. The gripping device includes a plurality of flexures. Each flexure is configured to couple predetermined linkages together, such that an input force is transferred from one portion of the device to another portion of the device. The gripping device further includes a fixed linkage and an input linkage disposed partially above the fixed linkage. The input linkage includes a first end portion and a second end portion. Each end portion of the input linkage comprises an output linkage, which in turn comprises a first end portion and a second end portion. Each end portion of the input linkage further comprises a jaw, which is disposed on the first end portion of the output linkage, and an initial damper linkage disposed below the fixed linkage. The initial damper linkage is coupled with the fixed linkage, the corresponding end portion of the input linkage, and the second end portion of the output linkage. At least one auxiliary damper linkage is further disposed below the fixed linkage and adjacent to the initial damper linkage. The at least one auxiliary damper linkage is coupled to the fixed linkage and the second end portion of the output linkage.

In the exemplary embodiments of the present invention, a default state of a gripping device will be described as an OPEN state unless stated otherwise. However, the present disclosure is not limited thereto. For instance, in the OPEN default state, if an input force is applied to the input linkage, the jaws move towards one another to decrease a size of a gap there between. In some embodiments, a default state of the gripping device will be a CLOSED state. In the CLOSED default state, of an input force is applied to the input linkage the jaws move away from each other to form, or increase, the size of the gap there between. In the exemplary embodiments, an input force is applied linearly to the input linkage. However, the present invention is not limited thereto. In some embodiments, an input force is applied to the output linkages in order to force the input linkage to move and/or bend.

Referring to FIGS. 1 through 5, gripping device 100 is disposed on transport linkage 200. The transport linkage is configured to allow the gripping device to be coupled to a transport mechanism. In some embodiments, the transport mechanism enables the gripping device to move in at least three axes about a predetermined spatial region (e.g., move about a Cartesian coordinate system in a predetermined spatial region). In some embodiments, the transport mechanism includes a robotic arm, a conveyer belt, a drone, or the like. In the present exemplary embodiment, the transport linkage includes one or more grooves (e.g., grooves 250 of FIG. 2) to facilitate coupling the gripping device to the transport mechanism. In some embodiments, the transport mechanism is configured to facilitate movement of the gripping device in two dimensions (e.g., about an X plane and a Y plane). In some embodiments, the transport mechanism is configured to facilitate movement of the gripping device in three dimensions (e.g., about an X plane, a Y plane, and a Z plane). In some embodiments, the transport mechanism is configured to facilitate movement of the gripping device in four dimensions (e.g., about an X plane, a Y plane, a Z plane, and an angular orientation (e.g., rotation)). Furthermore, in some embodiments the transport mechanism is coupled to one or more gripping devices (e.g., one or more gripping devices operated via a single transport mechanism). Additionally, in some embodiments, gripping device 100 includes mount 300. In some embodiments, the mount is configured to attach the gripping device in a similar manner as the above grooves (e.g., couples the gripping device to the transport mechanism). In some embodiments, the mount is configured to stabilize the fixed linkage (e.g., fixed linkage 140 of FIG. 2) and/or the gripping device. For instance, in some embodiments the gripping device is fixed about the mount in order to prevent the gripping device from moving in a predetermined direction (e.g., laterally, longitudinally, rotationally). Nevertheless, the gripping devices of the present disclosure are free to move and be used in a plurality of dimensions and in any spatial region in accordance with a design of the present invention.

Referring to FIGS. 2 through 5, gripping device 100 includes input linkage 110 and fixed linkage 140. In the present exemplary embodiment, the input linkage is configured as an arch shape. However, the present disclosure is not limited thereto. For instance, in some embodiments the input linkage is a rectangular bar or a T-shaped bar disposed above, interposed by, interposing between, or disposed below the fixed linkage. In some embodiments, input linkage 110 includes a first end portion and a second end portion that transfer an input force to one or more linkages, as well as a third end portion that receives an input force. In some embodiments, the first end portion and the second end portion of the input linkage are symmetric. However, the present disclosure is not limited thereto.

Each end portion of input linkage 110 includes initial damper linkage 130, output linkage 150, and jaw 160. Initial damper linkage 130 is disposed below fixed linkage 140 and coupled to output linkage 150 and fixed linkage 140 by flexures 120. The flexures of the present invention enable the gripping devices to transform between an OPEN state and a CLOSED state without utilizing sliding and/or moving parts. Due to a lack of sliding and/or moving parts, friction is not generated during operation of the gripping devices, thus preventing fine particle from being generated. This lack of particles is an essential feature when the gripping devices are utilized in microscopic domains, such as clean room environments. Moreover, the flexures of the present disclosure provide internal compliances to ensure components remain aligned. In the present embodiment, flexures 120 assist in transforming a direction of an input force from a first direction to a second direction (e.g., from a motion in a first plane to a motion in a second plane), dampening an input force, as well as maintaining alignment of the linkages. Design parameters of the flexures include, but are not limited to, a thickness and/or a gradient/tapering thereof, a width and/or a gradient/tapering thereof, one or more materials included in each flexure, a desired output force exerted by the gripping device, and the like.

In some embodiments, each end portion of input linkage 110 further includes at least one auxiliary damper linkage 135. In the present exemplary embodiment, there is one auxiliary damper linkage 135 for each end portion of input linkage 110. However, the present invention is not limited thereto. In some embodiments, there exists two auxiliary damper linkages for each end portion of the input linkage. In some embodiments, there exists five auxiliary damper linkages for each end portion of the input linkage. In the present exemplary embodiment, the first end portion and the second end portion of the input linkage are symmetrical. However, the present disclosure is not limited thereto. For instance, if a non-uniform gripping force is required by the gripping devices of the present disclosure, a non-symmetrical configuration of auxiliary damper linkages may be utilized.

Figure 2:
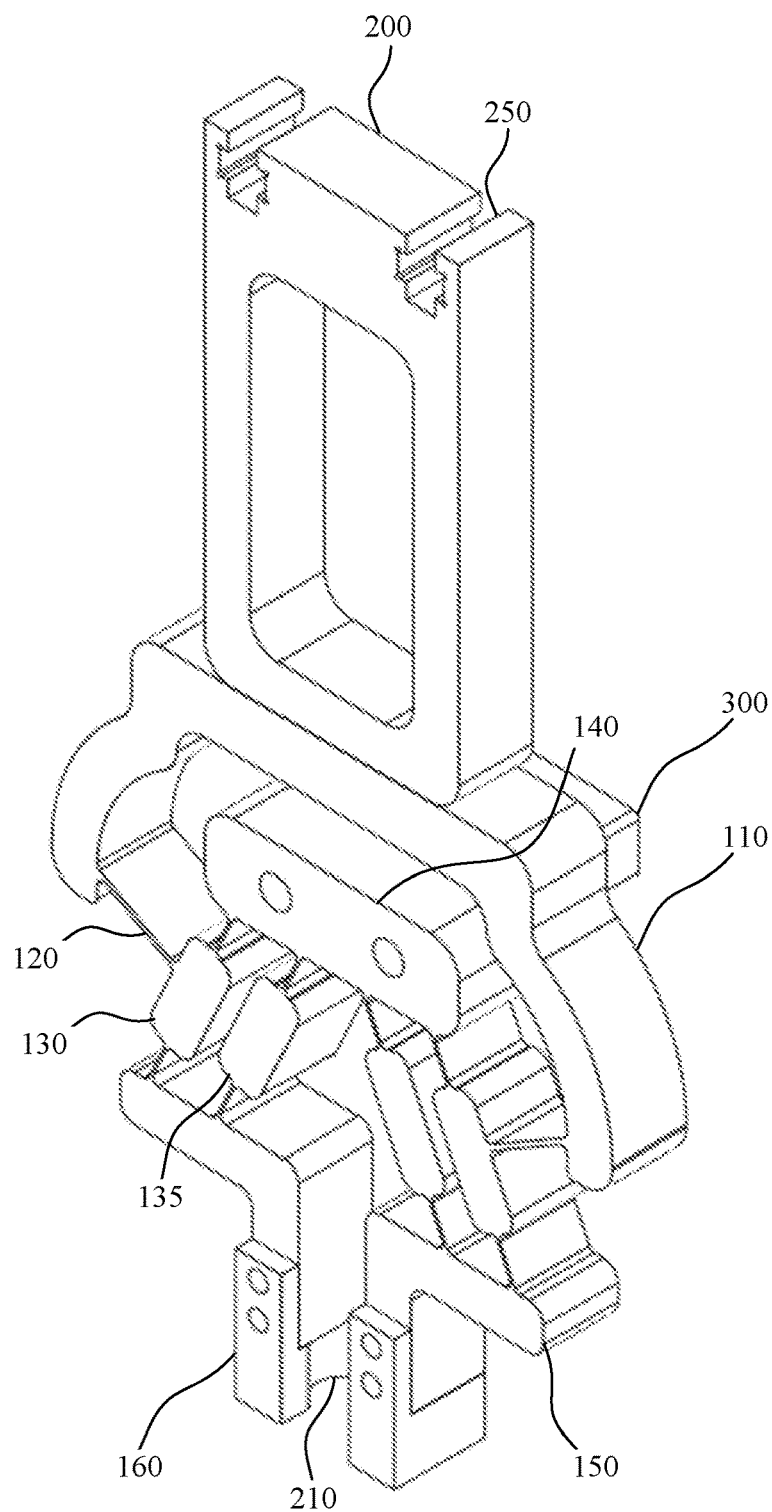
FIG. 2 is an isometric view of a gripping device in an open state in accordance with an exemplary embodiment of the present disclosure.
Figure 3:
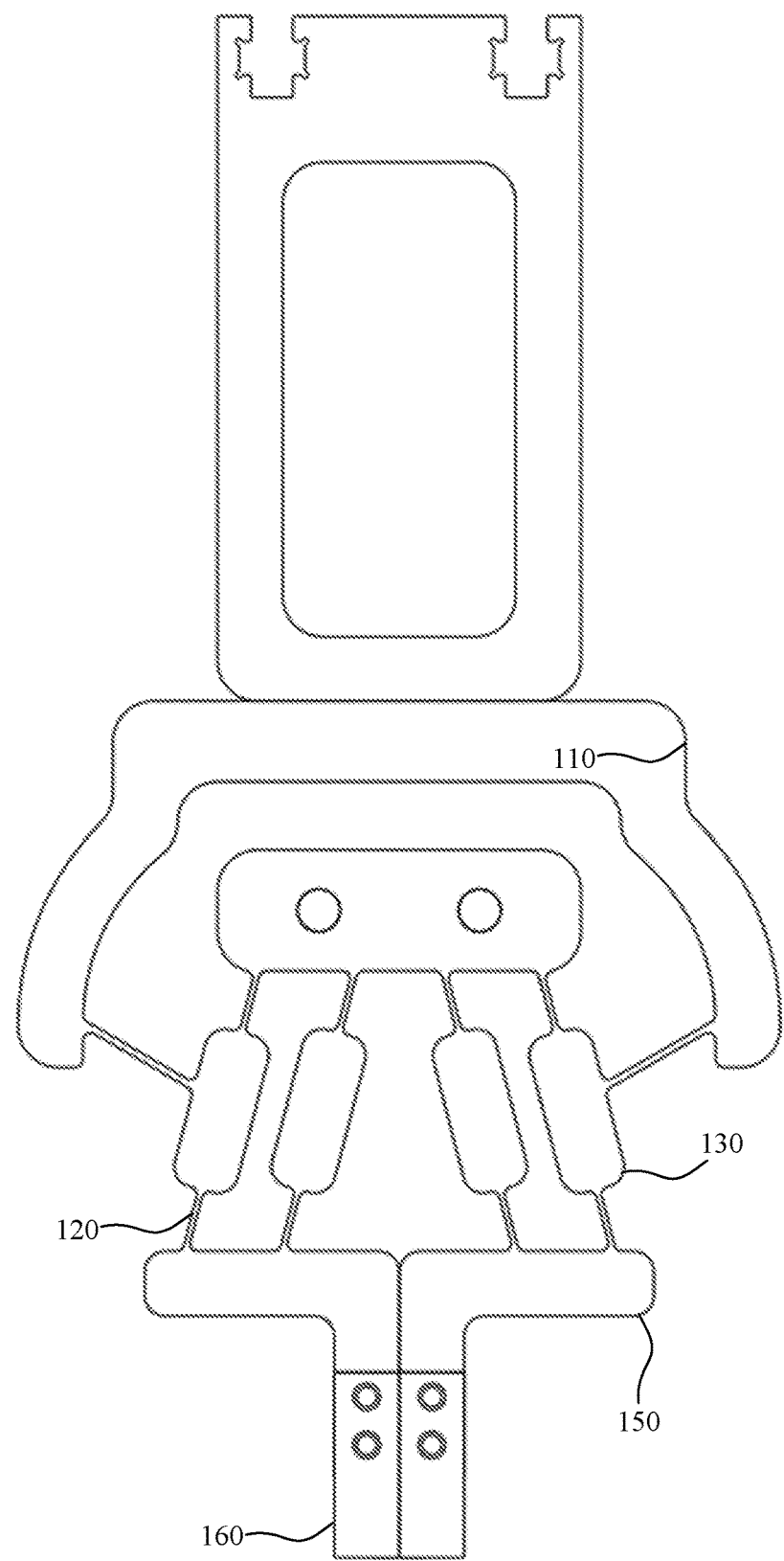
FIG. 3 is a front view of a gripping device in a closed state in accordance with an exemplary embodiment of the present disclosure.
Figure 4:
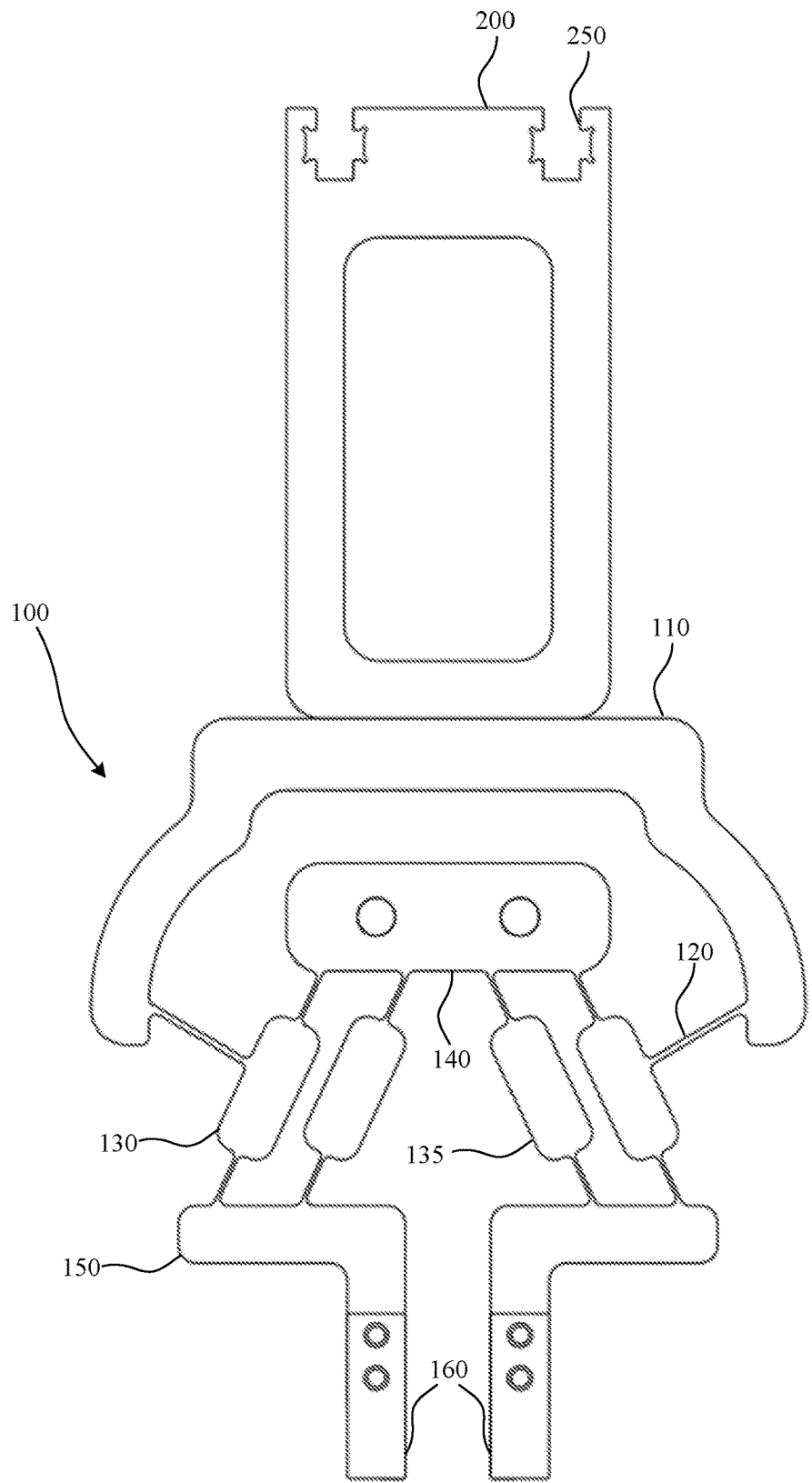
FIG. 4 is a front view of a gripping device in an open state in accordance with an exemplary embodiment of the present disclosure.
Figure 5:
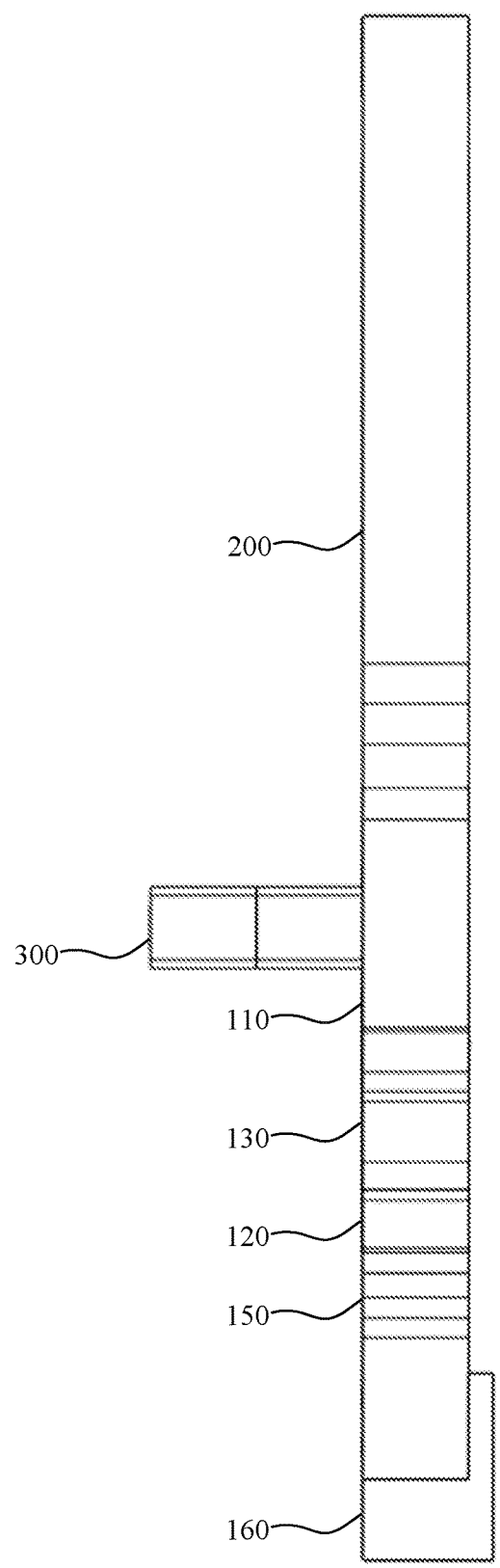
FIG. 5 is a side view of a gripping device in an open state in accordance with an exemplary embodiment of the present disclosure.
Figure 6:
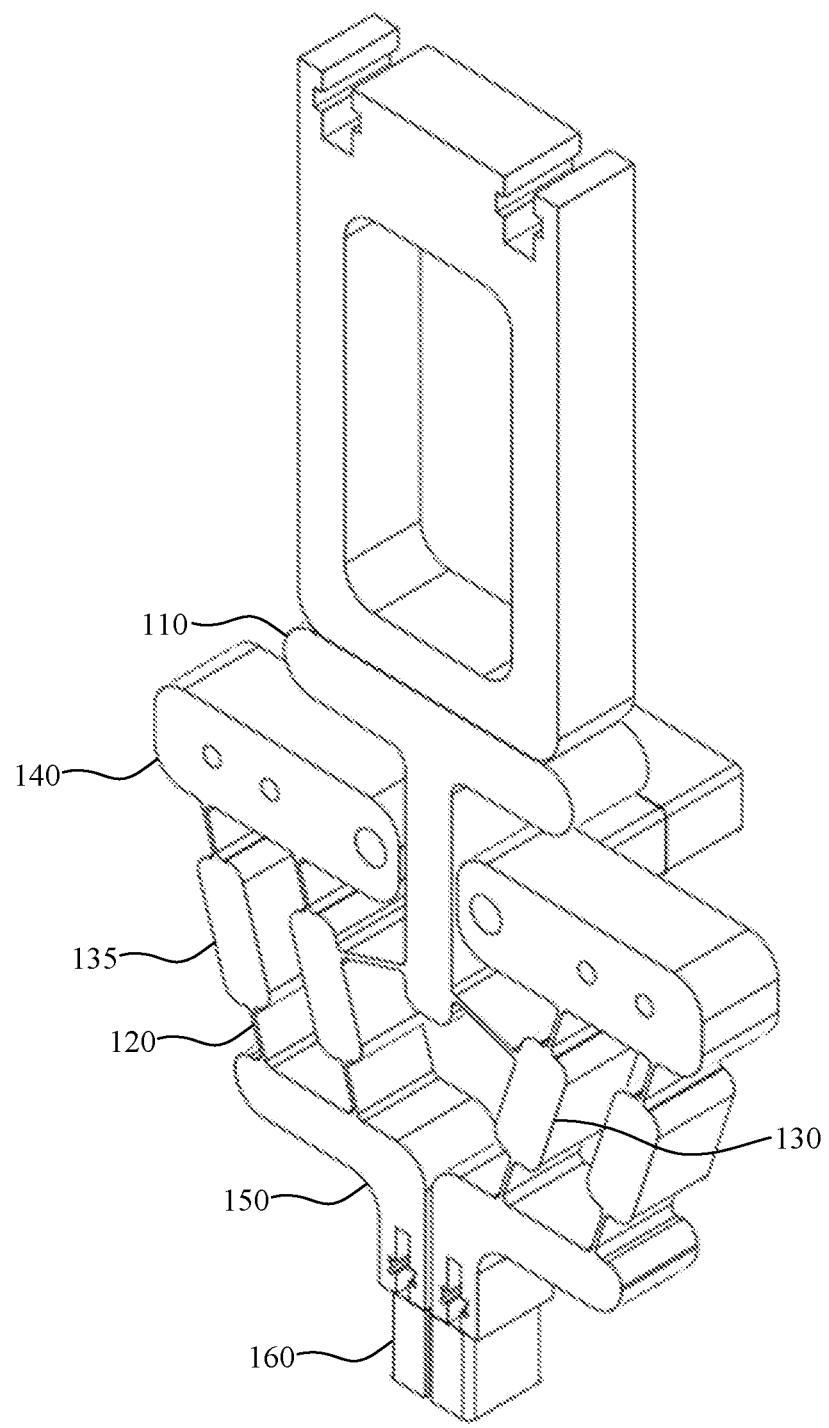
FIG. 6 is an isometric view of a gripping device in a closed state in accordance with another exemplary embodiment of the present disclosure.
Figure 7:
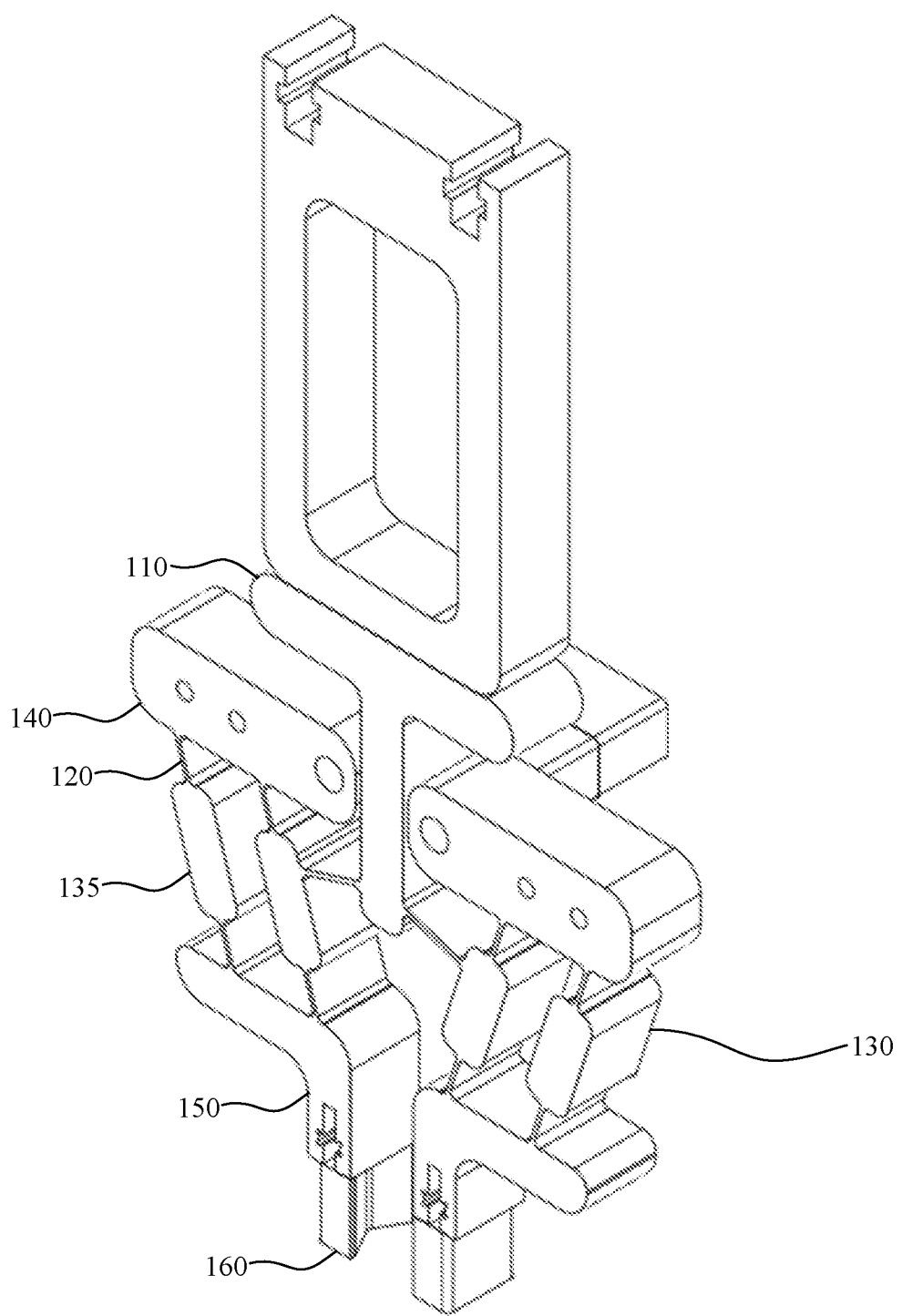
FIG. 7 is an isometric view of a gripping device in an open state in accordance with another exemplary embodiment of the present disclosure.
Figure 8:
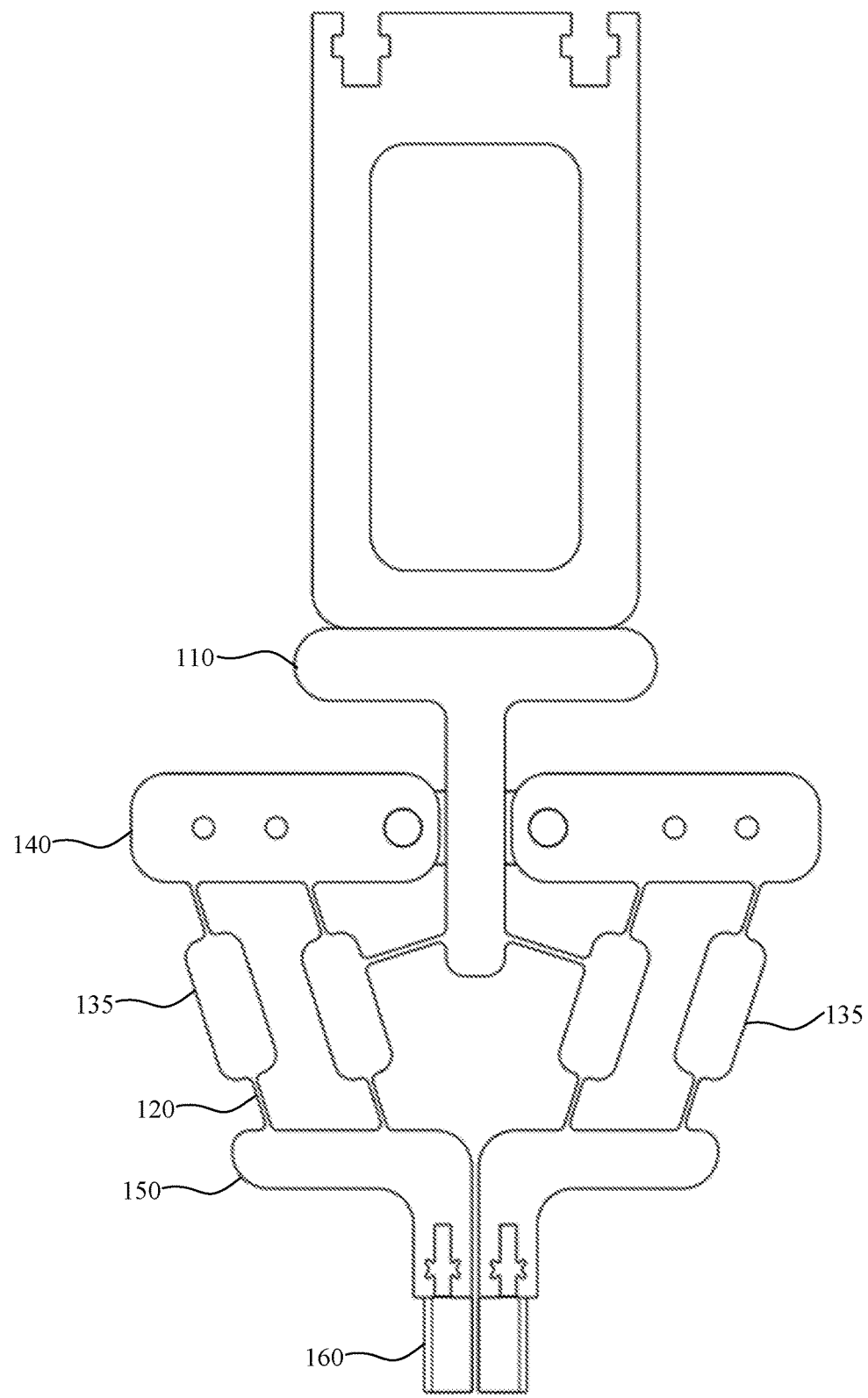
FIG. 8 is a front view of a gripping device in a closed state in accordance with another exemplary embodiment of the present disclosure.
Figure 9:
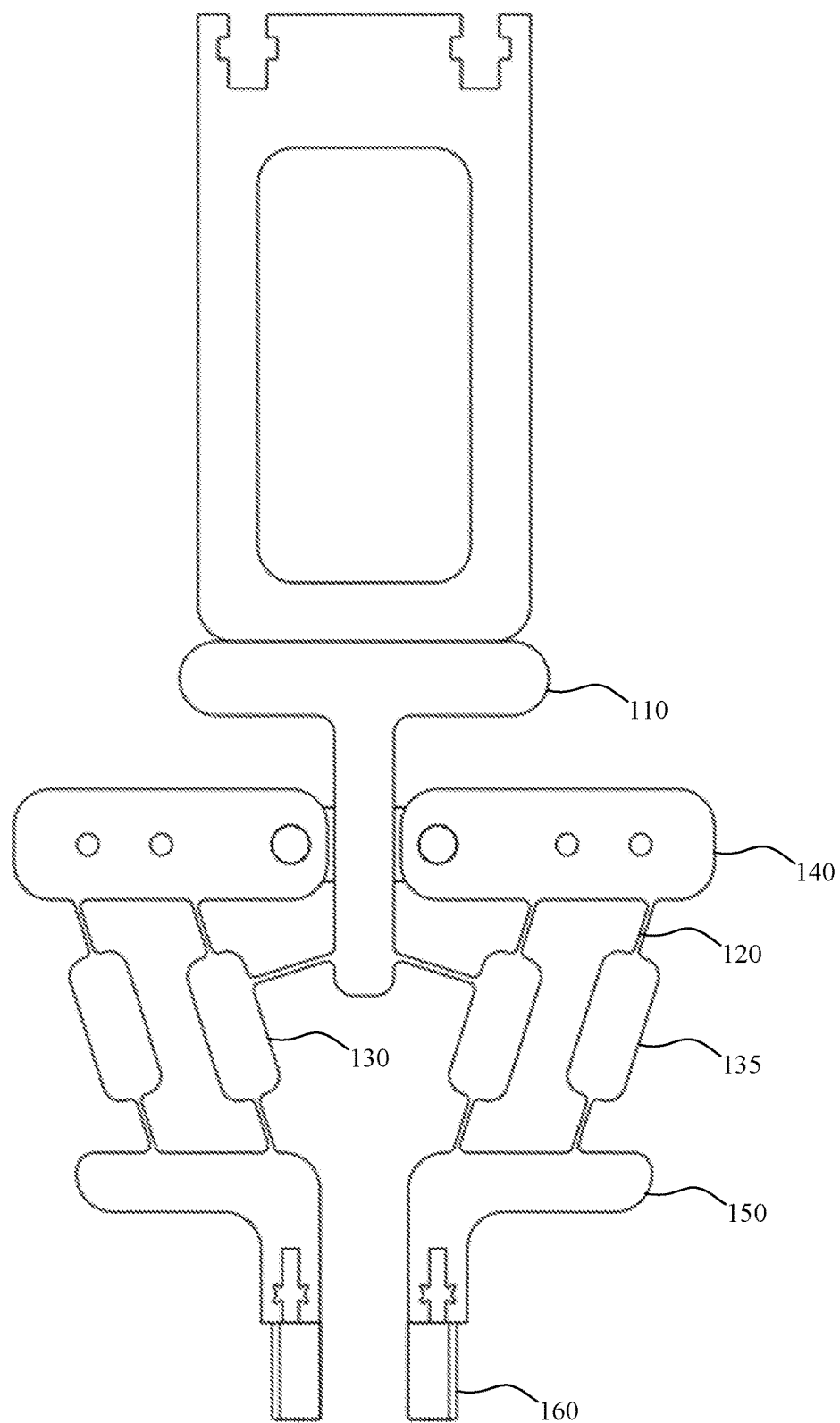
FIG. 9 is a front view of a gripping device in an open state in accordance with another exemplary embodiment of the present disclosure.

In some embodiments, a jaw 160 is disposed on a first end portion of each output linkage 150. In some embodiments, each respective jaw is removeably disposed on the first end portion of the output linkage. This removable configuration provides a mechanism for replacement of the jaws if a jaw becomes contaminated. However, the present invention is not limited thereto. In some embodiments, the jaws are integrated (e.g., molded) with the respective first end portion of the output linkage. In some embodiments, the jaws include a metal material such as steel. In some embodiments, the jaws include a deformable material such as plastic or an elastomer. Further, in some embodiments each jaw is a rigid member. However, the present disclosure is not limited thereto. For instance, in some embodiments the jaws are non-rigid, deformable members such as tentacles. In some embodiments, the jaws include a recessed portion (e.g., portion 210 of FIG. 2) such as a portion of a cup and/or cone that is configured to hold a sloped object. For instance, as illustrated in FIG. 2, in some embodiments a portion of each respective jaw is formed in a concave shape in order to accommodate a target object (e.g., a capsule). Furthermore, in some embodiments each respective jaw includes one or more protrusions (e.g., teeth) that are configured to engage a target object in order to better grip the object.

In some embodiments, a distance travelled between an OPEN state and a CLOSED state of each jaw is 15 millimeters (mm) or less. In some embodiments, a distance travelled between an OPEN state and a CLOSED state of each jaw is 10 millimeters or less. In some embodiments, a distance travelled between an OPEN state and a CLOSED state of each jaw is 6 millimeters or less. In some embodiments, a distance travelled between an OPEN state and a CLOSED state of each jaw is 5 millimeters or less. In some embodiments, a distance travelled between an OPEN state and a CLOSED state of each jaw is 3 millimeters or less. In some embodiments, a distance travelled between an OPEN state and a CLOSED state of each jaw is 1 millimeter or less. A distanced travelled between an OPEN state and a CLOSED state of each jaw typically depends on an object to be grasped and a force required to hold the object. For instance, in some embodiments a pharmaceutical capsule has an approximate diameter of 4.1 mm. Accordingly, a distanced travelled between an OPEN state and a CLOSED state of each jaw is greater than or equal to 2.1 mm.

In some embodiments, to ensure that the gripping device of the present disclosure does not damage or materially weaken a target object during operation, a distanced travelled between an OPEN state and a CLOSED state of each jaw includes a predetermined tolerance distance (e.g., a distance travelled between an OPEN state and a CLOSED state of each jaw is 5 millimeters including a 0.05 millimeter tolerance). In some embodiments, the predetermined tolerance is determined in accordance with aspect of a target object. For instance, if a parameter of the target object, such as a radius of the target object or a thickness of the target object, has a given tolerance (e.g., 1 millimeter), then the predetermined tolerance distance of each jaw is the given tolerance (e.g., 1 millimeter).

Furthermore, in some embodiments to ensure that the gripping device of the present disclosure does not damage or materially weaken a target object, the jaws of the gripping device exert a force that is sufficient to hold a target object against a force of gravity while not damaging of materially weakening the target object. For instance, in some embodiments a target object includes a pharmaceutical capsule. Accordingly, in order to hold the capsule without damaging it, the gripping device 100 exerts a force of from 0.05 N/mm to 0.2 N/mm. In some embodiments, the gripping device 100 exerts a force of from 0.01 N/mm to 0.5 N/mm. In some embodiments, the gripping device 100 exerts a force of from 0.02 N/mm to 0.5 N/mm. In some embodiments, the gripping device 100 exerts a force of from 0.015 N/mm to 0.3 N/mm.

Referring to FIGS. 6 through 9, another exemplary embodiment of gripping device 100 is depicted. Unlike the gripping devices of FIGS. 1 through 5, the gripping devices depicted in FIGS. 6 through 9 rest in a default CLOSED state. Thus, when an input force is applied to the input linkage, the jaws of the device retract. In the present exemplary embodiments, input linkage 110 interposes between fixed linkage 140, thus splitting the fixed linkage into two constitute components; however, the functionality of the fixed linkage and the input linkage are not altered.

In some embodiments, the gripping device includes a deformable material. In some embodiments, the gripping device includes a plastic or metal material. For instance, in some embodiments the gripping device includes an acetal copolymer. A stiffness of the gripping device is proportional to a stiffness of a material of the flexures, as well as the second moment of area and inversely proportional to a cube of a length of the flexures. Moreover, a total range of motion of the gripping device (e.g., a distance traveled between respective portions of each jaw) is proportional to a ratio of max stress over the Young's modulus of the material, and proportional to a ratio of a length to a thickness of the flexures. Accordingly, $\delta\_max/L$ is proportional to $(\sigma\_max/E)(L/h)$, where $\delta\_max$ is a maximum displacement (e.g., a distance between an ON state and an OFF state of each respective jaw or a total distance between respective jaws), $\sigma\_max$ is a max allowable stress, E is the Young's Modulus of the material; L is a beam length, and h is a beam thickness, where each flexure is approximated as a beam one or more free ends. Thus, an approximate stiffness is $\kappa = CEI/L^3$ where $\kappa$ is stiffness, C is a configuration constant (e.g., a constant of 3).

For instance, in some embodiments the gripping device includes an acetal plastic. Accordingly, a minimum thickness of the gripping device is 0.4 mm. Accordingly, if flexures are formed with a length of 16 mm, a width of 13.1 mm, and a thickness of 0.4 mm with an estimated elasticity of 3 giga Pascal (GPa), this configuration would yield a stiffness of approximately 0.155 N/mm at an end portion of a range of motion of 6 mm. In another embodiment, the gripping device includes a stainless steel material. Accordingly, a flexure of the same above described stiffness (e.g., a stiffness of approximately 180 GPa) and range of motion (e.g., 6 mm) would instead have a length of approximately 65 mm. Accordingly, a gripping device that includes a metal material requires a length that is about quadruple in size. In order to reduce a size of the gripping device if including a metal material, at one the flexures of the present disclosure is formed with a thickness of approximately 0.2 mm, which would in turn require a length of approximately 35 mm. In considering selection of materials of the gripping device, metal flexures typically have a longer operational lifetime as the flexures are capable of withstanding a larger number of cycles before suffering from fatigue, are generally more durable, and the internal stresses and strains are going to be smaller (comparatively to plastics) in the metal flexures.

In some embodiments, the gripping device is fabricated by additive manufacturing or water jet cutting. Typically, the gripping devices of the present invention are formed as a single continuous piece of material, excluding the jaws when the jaws are formed of a different material.

As previously described, the configurations of the initial damper linkage and the one or more auxiliary damper linkages provide internal compliances to the device. In some embodiments, the jaws of the present invention only exhibit translational motion while resisting rotation motion. For instance, the configurations of the initial damper linkage and the one or more auxiliary linkages ensure that the jaws reset to an original position and are always parallel to each other. Permanent and alignment of the jaws is essential for grasping non-uniform objects and objects of varying size without a need for replacement jaws.

For convenience in explanation and accurate definition in the appended claims, the terms "upper", "lower", "up", "down", "upwards", "downwards", "inner", "outer", "inside", "outside", "inwardly", "outwardly", "interior", "exterior", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A gripping device comprising:
   a fixed linkage;
   an input linkage disposed at least partially above the fixed linkage, the input linkage comprising a first input end portion and a second input end portion, wherein each input end portion comprises:
   an output linkage comprising a first output end portion and a second output end portion,
   a jaw disposed on the first output end portion of the output linkage, and
   an initial damper linkage disposed below the fixed linkage, the initial damper linkage coupled with the fixed linkage, a corresponding input end portion of the input linkage, and the second output end portion of the output linkage;
   a plurality of flexures, wherein each respective flexure in the plurality of flexures is configured to couple two or more linkages together; and wherein
   the flexure gripping device is formed from a deformable material.

2. The gripping device of claim 1, wherein for each respective input end portion of the input linkage the plurality of flexures includes:
   a first flexure that couples the input linkage and the respective initial damper linkage,
   a second flexure that couples the respective initial damper linkage and the fixed linkage, and
   a third flexure that couples the respective initial damper linkage and the output linkage.

3. The gripping device of claim 1, wherein at least one auxiliary damper linkage is disposed below the fixed linkage and adjacent to the initial damper linkage, the at least one auxiliary damper linkage coupled to the fixed linkage and the second output end portion of the output linkage.

4. The gripping device of claim 3, wherein for each respective auxiliary damper linkage the plurality of flexures includes:
   a fourth flexure that couples the respective auxiliary damper linkage and the fixed linkage, and
   a fifth flexure that couples the respective auxiliary damper linkage and the output linkage.

5. The gripping device of claim 1, wherein a distance travelled between an OPEN state and a CLOSED state of each jaw is 15 millimeters or less.

6. The gripping device of claim 1, wherein a distance travelled between an OPEN state and a CLOSED state of each jaw is 4 millimeters or less.

7. The gripping device of claim 1, wherein the gripping device is fabricated from a single piece of material.

8. The gripping device of claim 1, wherein the gripping device is fabricated by additive manufacturing or water jet cutting.

9. The gripping device of claim 1, wherein the gripping device further comprises a mount configured to attach the gripping device to transport mechanism.

10. The gripping device of claim 1, wherein each jaw is selected from the group consisting of a tentacle, a cup, or a cone.

\* \* \* \* \*